United States Patent [19]

Trout

[11] 4,414,871
[45] Nov. 15, 1983

[54] CHUCK FORCE MODULATOR SYSTEM FOR ROTARY TYPE MACHINE TOOL

[75] Inventor: David H. Trout, Woodbury, Conn.

[73] Assignee: White Consolidated Industries, Inc., Cleveland, Ohio

[21] Appl. No.: 327,078

[22] Filed: Dec. 3, 1981

[51] Int. Cl.$^3$ .............................................. B23B 31/30
[52] U.S. Cl. ................................... 82/40 R; 82/28 R; 91/459; 279/4
[58] Field of Search ................. 91/458, 459; 279/1 C, 279/4; 51/237 R; 82/28 R, 40 R

[56] References Cited

U.S. PATENT DOCUMENTS

| 2,955,391 | 10/1960 | Fred | 51/237 R |
| 3,618,270 | 11/1971 | Koide | 82/40 R |
| 3,815,929 | 6/1974 | Steinberger et al. | 279/4 |
| 4,314,706 | 2/1982 | Pruden | 279/1 C |

OTHER PUBLICATIONS

Bullard Briefs, *VTL Chuck Jaw Force Modulator*, The Bullard Company, 1981.

Primary Examiner—W. D. Bray
Attorney, Agent, or Firm—Mandeville & Schweitzer

[57] ABSTRACT

The disclosure relates to an improved chuck force control and compensating means for rotary machine tools, such as lathe. The control is used with power-operated chucks and provides reliable and effective compensation for the effect of centrifugal force, which otherwise tends to reduce gripping force on the workpiece. The control includes a static adjust signal generator, for establishing the desired level of gripping force upon the workpiece, and a rotation speed responsive signal generator, for generating a signal which is a function of the square of the rotational speed. These two signals are combined and serve to actuate a servo valve to control hydraulic pressure delivered to the power operated chuck. Hydraulic pressure increases with increased rotational speed, in order to maintain chucking force at a constant level. A feedback circuit detects the level of hydraulic pressure and compares to the combined signals, developing a fault signal where the output hydraulic pressure does not agree with the signal delivered to the controlling servo valve. The circuit includes a redundant, parallel system for generating static and dynamic signals, combining them and comparing them to the primary combined signals. The redundant system prevents an unintended loss of chucking force in the event of failure of any of the primary signal generating components.

4 Claims, 2 Drawing Figures

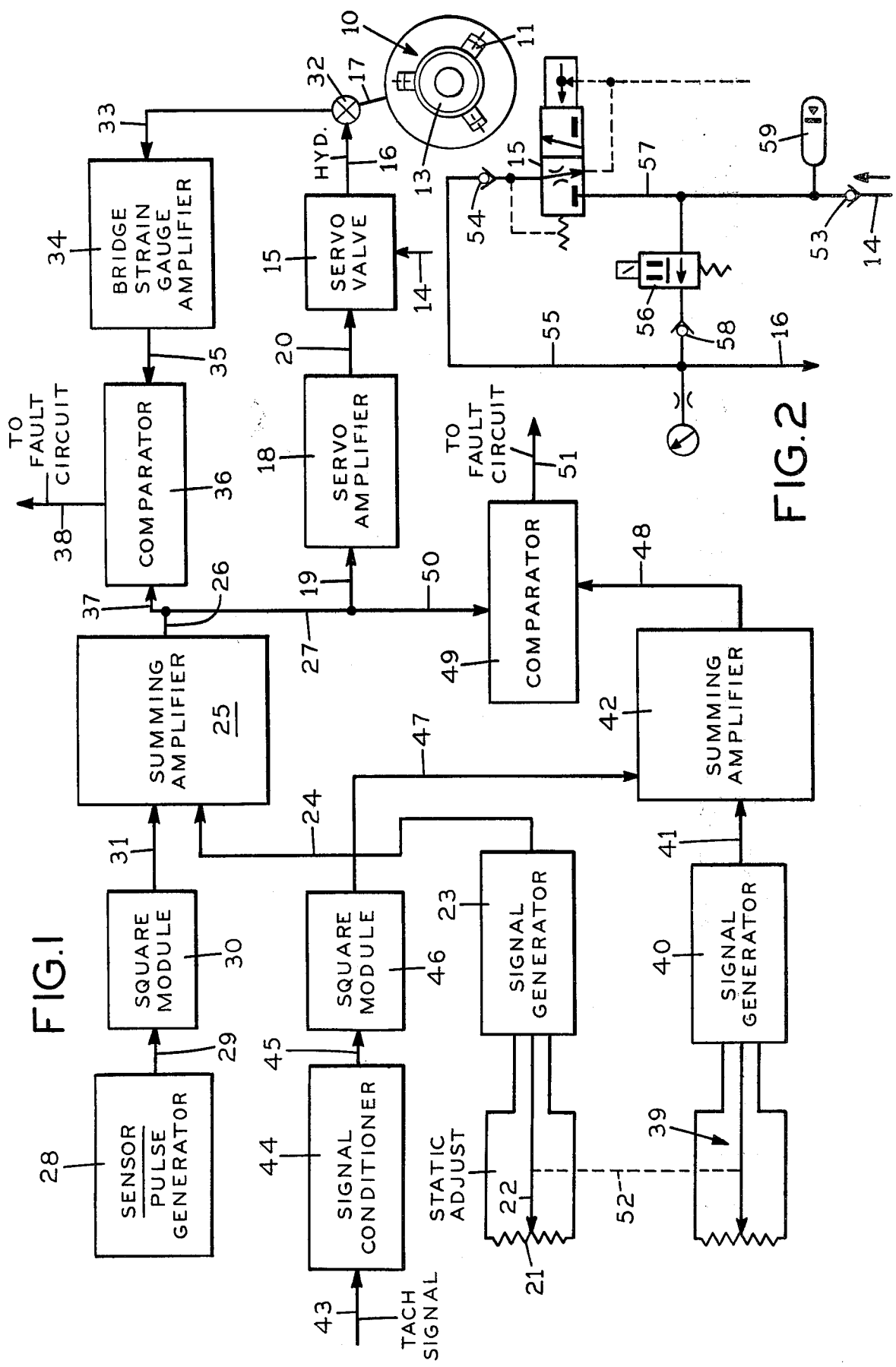

CHUCK FORCE MODULATOR SYSTEM FOR ROTARY TYPE MACHINE TOOL

BACKGROUND AND SUMMARY OF THE INVENTION

Various machine tools, such as lathes, incorporate means for chucking and rotating a workpiece to be machined. In many such machines, the chucking mechanism is power operated, through an hydraulic actuating means. In a typical rotary machine tool, the work holding chuck is mounted for controlled rotation relative to a cutting tool and includes a plurality (frequency three) of radially movable gripping jaws. These gripping jaws are adapted to be controllably advanced into pressure gripping contact with the workpiece, which is normally a body of revolution.

During rotation of the chucking device, centrifugal force acts outwardly against the radially movable gripping elements, tending somewhat to counteract and reduce the radially inward gripping force applied through the hydraulic actuating system. Such outward centrifugal forces become increasingly consequential with increasing chucking diameters and also, of course, with increasing speeds, effectively subtracting from the initial gripping force on the workpiece. It is possible, in some cases, to compensate for the effective centrifugal forces on the gripping elements by setting the initial gripping force to be larger than necessary, by an amount approximating the anticipated loss of gripping effect through centrifugal force. However, this is impracticable in many instances and impossible or undesirable in others. For example, where the workpiece is subject to crushing or distortion by excessive chucking force, it would be altogether inappropriate to attempt to overcome centrifugal force by overloading the chucking forces in the first instance.

The problem of loss of chucking force through centrifugal force has been recognized in the past. Early attempts to compensate for centrifugal force have involved the use of counterweight mechanisms. However, these mechanisms inherently suffer disadvantage of requiring extra weight and bulk. Particularly as the turning equipment becomes larger and is designed to operate at increasingly higher speeds, arrangements for mechanically counterweighing the gripping jaws become entirely impractical.

A somewhat more effective solution has been marketed heretofore by The Bullard Company, Bridgeport, Conn. This system has utilized a manually adjustable pressure regulator mechanism for establishing the initial force levels of the gripping elements upon the workpiece. During rotation of the chuck, its speed of rotation is sensed, and an electronic signal proportional to the speed of rotation operates through a servo valve system to incrementally increase the initial pressure setting as a function of the amount of centrifugal force introduced by such rotational speed. This system represented a substantial advance over mechanical couterweighting systems, in that the chuck and rotating parts did not require the massive and unwieldy counterweighting units characteristic of the mechanical devices.

In accordance with the present invention, a new and improved chuck force compensating system is provided, which utilizes hydraulic pressure compensation, somewhat in the manner of the earlier Bullard control described above, but which incorporates significant advantageous features providing superior performance and enabling the system to be fail-safe in operation. As will be appreciated, the need for chuck force compensation becomes increasingly acute with parts and chucking mechanisms of greater size and operated at higher speeds. Concomitantly, the consequences of a failure in the system become increasingly significant with higher speeds and weights, such that the need for fail-safe operation is parallel with the need for chuck force compensation.

In accordance with the present invention, a novel and improved power chucking system is provided, which incorporates, in addition to speed-sensing chuck force compensation means, a fail-safe system effective to shut down machine operation if the chucking force applied is in fact less than that which is scheduled for the operating conditions. To this end, the system of the invention incorporates a fully electronic system for chuck force control, in which the initial chucking force, as well as the compensation for rotational speed, is effected by the inputting of controlled electrical signals, such that the actual chuck force applied is a resultant of a so-called static signal, reflecting the initial chucking force, and a dynamic signal responsive to rotational speed. This inputting arrangement, in conjunction with a feedback system responsive to chuck force actually applied, provides for continuous self-monitoring of applied chuck force versus scheduled chuck force and bringing about stoppage of the machine if there is a consequential difference.

In accordance with another aspect of the invention, a redundant, parallel system is provided for creating a signal voltage comparable to the control voltage developed by the primary system. The secondary voltage is constantly compared to the primary signal voltage and, in response to any consequential difference, a shut down of the machine is effected. Thus, in the primary control system, there is a possibility, all be it relatively remote, that the primary control signal, by reason of malfunction in the signal generating and modifying circuitry, could experience a so-called decay fault, resulting in gradual reduction or loss of the control voltage. If this occurs sufficiently gradually, the servo system controlling the chuck gripping elements, and the feedback system monitoring the applied gripping force can respond, resulting in gradual loss of gripping force without indication of fault. In the system of the present invention, however, by providing a redundant signal, from a separate and independent source, it is possible to make a constant comparison of the primary control signal and the redundant signal. If at any time there is a consequential difference between the two, a fault signal is generated. To particular advantage, the redundant signal may utilize the output signal from the tach generator normally provided with the rotating equipment, while the primary signal is derived from an entirely independent sensing element.

In accordance with another apsect of the invention, provision is made for safe coast-down of the equipment in the event of total power failure, which would of course result in the loss of control signal to the servo system controlling the power operated chucking elements. The system includes a gas-hydraulic accumulator, which becomes charged during normal operation of the hydraulic system feeding the power operated gripping elements. Normal flow of hydraulic fluid to the chuck actuator is through a servo-operated pressure control valve, which operates in response to the speed-responsive control system described above. A bypass circuit is provided around the servo-operated pressure control valve, through a normally open solenoid actuated valve. During all power-on conditions, the solenoid valve is actuated to a closed condition. However, upon any kind of catastrophic power loss, the bypass valve reverts to an open position, bypassing the servo pressure control valve and connecting the gripping device directly to the hydraulic accumulator, which maintains pressure until the machine comes to a safe stop.

For a more complete understanding of the above and other features and advantages of the invention, reference should be made to the following detailed description of a preferred embodiment and to the accompanying drawing.

DESCRIPTION OF THE DRAWING

FIG. 1 is a highly simplified, schematic representation of a chuck force modulating control system incorporating advantageous features of the invention.

FIG. 2 is a simplified illustration of an auxiliary circuit, used in combination with the circuit of FIG. 1, to provide for the maintenance of chuck gripping force during stoppage of the equipment after a power outage.

DESCRIPTION OF A PREFERRED EMBODIMENT

Referring now to the drawing, there is shown a schematic circuit for controlling the application of hydraulic pressure to an hydraulically operated rotary chuck 10 mounted for controlled driven rotation on a rotary type machine tool, such as a lathe. The chuck 10 has a plurality, typically three, of gripping elements 11, which are arranged for simultaneous radially inward or outward movement on the chuck body 12, toward or away from a workpiece 13. The chuck 10 may be of a conventional type, in which the several gripping elements 11 are actuatable for simultaneous radial movement by means of an hydraulic actuator (not shown). In the illustrated arrangement, the hydraulically actuated chuck is operated from a source 14 of hydraulic fluid under pressure, which is controlled through a servo valve 15. The reference numerals 16, 17 symbolically represent hydraulic lines leading from the servo valve 15 to the chuck 10, for actuation of the chuck gripping elements 11 in an inward or outward direction, and for maintenance of a desired level of gripping force on the workpiece 13 during machining operations. The servo valve 15 may be of any of a variety of types, being of conventional design concepts. Continental's pressure reducing valve EP 35M-30A O5 G1-75 has proven satisfactory for operation at pressure levels ranging from zero to 3,000 psi.

Operation of the servo valve 15 is controlled by a servo amplifier 18, which receives a signal voltage through input conductors 19, converting the signal voltage to a corresponding operating-level voltage delivered to the servo valve through conductors 20. The operation of the servo valve is such that the pressure levels at the output side of the valve are a function of the voltage applied thereto through the conductors 20, which is in turn a function of the signal voltage entering the amplifier at 19. Thus, the inlet pressure at 14 may be on the order of 3,000 psi, for example, and the outlet pressure at 16 will be a fractional function thereof, depending upon the level of the signal voltage at 19. Gripping force of the chuck 10 upon the workpiece 13 is, in turn, a function of the hydraulic pressure output at 16.

In accordance with one aspect of the invention, the initial chucking force applied by the gripping force elements 11 is established through a so-called static adjust control which, in an elementary form of the invention, may be a potentiometer 21. The voltage pickoff 22 of the potentiometer 21 is inputted to a signal generator 23 which converts the potentiometer voltage to an appropriate signal to be outputted at 24 to a summing amplifier 25. Both the signal generator and the summing amplifier may be in the nature of conventional, commercially obtainable circuit components. The signal generator 23 may, for example, be manufactured by Action Instrument under its part No. AP4003, while the summing amplifier may be Action Instrument part No. AP4402.

As reflected in FIG. 1, output of the summing amplifier 25 is directed through conductor means 26, 27 to the servo amplifier 18, which may to advantage be Continental's electronic control module ECM-1-MM16-A-75. Thus, the voltage level input to the signal generator 23, as established by the adjustment of the static adjust potentiometer 21 actuates the servo amplifier and servo valve to predetermine the initial gripping force applied by the elements 11 to the workpiece 13. In accordance with the invention, this initially established static gripping pressure is substantially maintained throughout the machining operation, independent of the rotational speed of the chuck 10, by reason of the compensating control features to be described. The static adjust feature of the invention, while being an important integral part of the modulating control system and safety features, is also advantageous from a convenience standpoint. For example, the potentiometer 21 may conveniently be located at an operator's console, quite remote from the chuck or the hydraulic system which supplies the chuck with actuating pressure. Moreover, since the static gripping pressure is a function of a control voltage, such control voltage may be easily generated from a machining program, so as to be an integral part of a computer controlled machining operation.

After the initial gripping force is established through the static adjustment potentiometer 22, pressure compensation is provided for upward adjustment of the hydraulic pressure with increasing rotational speeds of the chuck 10. To this end, the system of the invention includes a sensor and pulse generator facility, designated by the reference numeral 28. The sensor typically may be a so-called Airpax sensing pickup, part No. 1-000-1, which is arranged adjacent one of the large gears driving the chuck 10 (or rotary table, in the case of a vertical lathe) and arranged to sense the passage of individual teeth of the gear. The passage of each tooth generates a signal pulse via a related Airpax circuit (part No. 2-001). The output of the sensor-pulse generator 28 is a series of pulses corresponding to the rate of passage of gear teeth past the pickup sensor which, of course, is a function of the rotational speed of the chuck 10.

Centrifugal force is a function of the square of the rotational speed of the chuck, and thus the speed-responsive signal from the sensor pulse generator 28 is inputted via conductors 29 to a squaring circuit module 30, which converts the incoming signal, which is a function of chuck rotational speed, to a modified signal, which is a function of the square of that rotational speed. The squaring module may be a commercially available circuit component, such as part No. AP4430, available from Action Instrument.

The squared-function signal from the module 30 is transmitted through conductor means 31 to the summing amplifier 25, which also receives a signal from the static adjustment pontentiometer 22. The summing amplifier combines the static and dynamic signal inputs, resulting in an output signal directed through conductors 26, 27 and 19 to the servo amplifier 18, which is a function of both the static adjustment (initial gripping pressure) and the square-function signal (for speed compensation). Accordingly, regardless of the speed of rotation of the chuck 10 and variations in speed during machining operations, the net gripping upon the workpiece 13 remains substantially the same.

In accordance with one aspect of the invention, the chuck force control is provided with a feedback system, which provides for verification that the gripping force called for by the output signal of the summing amplifier 25 has in fact been achieved. To this end, the hydraulic output circuit 16, 17 includes a pressure transducer element 32, which senses the fluid pressure in the conduits leading to the chuck 10 and inputs this through conductor means 33 to an amplifier device 34. The output of the feedback amplifier 34 is transmitted through conductor means 35 to a comparator circuit 36, which also receives an input signal from the summing amplifier 25, through conductor means 26, 37. The comparator circuit 36 is operative to relate the respective signal inputs, from conductors 35, 37. The design of the circuit components is such that, when the hydraulic pressure in lines 16, 17, as sensed by the transducer 32, corresponds properly with the magnitude of the signal outputted by the summing amplifier 25, the input signal from the amplifier 34 will equal the input signal from the summing amplifier 25. If, at any time, the comparator module 36 detects a consequential difference in the signal voltages, a signal is outputted through a conductor 38 to a fault circuit (not specifically shown). The fault circuit may perform any one or more of a variety of consequential actions, such as shutting off the machine, operating an audible alarm, energizing a signal light, or the like, so that an appropriate response is taken, automatically or otherwise.

In accordance with another aspect of the invention, it is recognized that a malfunction in the inputting side of the circuitry, while not a likely occurrence, could result in an undesirable reduction of chuck gripping force, through an unintended reduction or decay in the signal outputted by the summing amplifier 25. If this occurred on a relatively gradual basis, the hydraulic pressure in the chuck actuating system could be gradually reduced, and the feedback signal would properly reflect the reduced level of hydraulic pressure. The comparator circuit, in such a case, would not necessarily detect a fault condition. To obviate the possibility of loss of gripping force in this manner, however unlikely, the system of the invention incorporates a redundant, parallel signal generating circuit, which includes a static adjust means, such as a potentiometer 39 and signal generator 40, which generally correspond to the potentiometer 21 and signal generator 23 of the primary circuit. These circuit elements input through conductor means 41 to a summing amplifier 42 corresponding in general to the earlier mentioned summing amplifier module 25.

A redundant speed-responsive signal advantageously is derived from the tach generator (not shown) which is customarily incorporated into the main drive mechanism for the lathe, in conjunction with the main drive speed control. The output signal from the tach generator is inputted via conductor means 43 to a signal conditioner 44, which converts the tach signal into a form generally corresponding to the signal outputted from the pulse generator of the primary control circuit. This conditioned tach signal is transmitted through conductor means 45 to a squaring module 46 corresponding generally to the squaring module 30 of the primary circuit, and this squared signal of the summing amplifier 42 is outputted through conductor means 47 to the summing amplifier 42. Accordingly, the output of the summing amplifier 42 is a signal reflecting both the initial static adjustment, corresponding to the initial level of gripping pressure, and the compensation required to nullify the effect of rotational speed.

The output signal is transmitted through conductor means 48 to a comparator circuit 49 whose other input is the output of the primary summing amplifier 25, through conductor means 50. The comparator circuit 49 thus serves to compare the signals derived from the parallel summing amplifiers 25, 42. If these signals differ in any consequential respect, a fault condition is identified, and a signal is outputted through conductor 51 to the fault circuit, for an appropriate response. Accordingly, should any malfunction occur in the components from which the primary control signal is derived, the condition cannot result in an unscheduled reduction of gripping pressure at the chuck, because the fault condition is detected immediately, by the comparator 49. It will be noted that the redundant input signal from the summing amplifier 42 is not passed through to the servo amplifier to control the chuck 10 (although that could be accomplished if desired). Rather, the redundant circuit merely serves as a basis of comparison of the primary signal.

Where a manual static adjust is provided for, via a device such as the potentiometer 21, the primary potentiometer 21 may be mechanically ganged with the potentiometer 39 of the redundant system through a mechanical interconnect 52.

Of particular significance in the circuit arrangement of the invention, both the static and the dynamic controls are provided by way of electrical signals. This enables the feedback and comparator circuit provisions to compare the hydraulic actuating pressure furnished to the rotating chuck with a signal which reflects the desired level of static gripping force, as well as the necessary compensation signal. This provides for a more reliable control and safety system then would be feasible where the initial gripping pressure is subject to purely mechanical adjustment.

An additional feature of the control system of the invention involves the use of a bypass circuit for automatically loading the chuck actuating system in the event of power failure. As will be appreciated, in the event of a power failure, although the rotating equipment will coast to a stop, all control voltages may be lost and sensed and servo valve means obviously will not function properly. Accordingly, the circuit of the invention advantageously may include the facility of FIG. 2 to provide emergency loading of the chuck during the coast-down period after a sudden power loss.

The system of FIG. 2 includes the source 14 of hydraulic pressure, which leads normally through a check valve 53 to the servo valve 15. On the output side of the servo valve 15, there is a further check valve 54, which communicates with a fluid conduit member 55 connected ultimately to the hydraulic output conduit 16 leading to the chuck actuator.

Pursuant to a feature of the invention, a normally open, two-way solenoid valve 56 is connected between conduit 57, on the inlet side of the servo valve and conduit 55, on the outlet side, so as to bypass the servo valve when the solenoid valve is open. A check valve 58 is located on the outlet side of the bypass valve 56.

During normal operation of the system, the bypass valve 56 is maintained in a closed condition by constant energization of its actuating solenoid. This causes all of the fluid flow to pass through, and be controlled by, the servo valve 13 in a desired manner. Upon the occasion of a power failure, the bypass valve solenoid is of course deenergized, and the valve assumes its normally open condition, allowing fluid to bypass the servo valve and flow directly through the bypass valve 56 and check valve 58. In order to maintain pressure on the chuck, a gas-liquid accumulator 59 is provided in the system, downstream of the check valve 53. During normal operation, the accumulator is of course charged to the hydraulic pressure at the inlet side of the system. Upon loss of power, and assuming there is simultaneously a loss of hydraulic pressure from the source 14, the check valve 53 closes and pressure continues to be applied to the system via the accumulator 59. This is designed to be more than adequate to maintain gripping pressure at the chuck during the coast-down period of the machine.

The system of the invention is both simple and reliable, yet extremele functional in enabling highly accurate gripping force to be applied to a workpiece under static conditions, and to be maintained on the workpiece throughout the machining operation, substantially regardless of rotational speeds of the chuck. By this means, even a relatively delicate part may be gripped and machined at high speed in a rather massive chuck or table, while maintaining at all times a carefully controlled gripping force on the workpiece.

The circuit of the invention, deriving the static gripping by means of an electrically generated signal, which is combined with a speed-responsive signal, greatly simplifies the utilization of fail-safe feedback circuitry and effective redundant circuitry, because a common output signal is provided which is reflective of both the static and the dynamic conditions of the machine.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A chuck force control and compensating means for a rotary machine tool or the like having a power operated rotary chuck with radially movable gripping element, which comprises
   (a) an hydraulic supply system for said chuck,
   (b) an electrically controlled servo valve in said supply system for regulating the fluid pressure delivered to said chuck in accordance with an electrical input to said servo valve,
   (c) a first electrical signal generator operative to provide an output signal corresponding to a function of the desired gripping pressure,
   (d) a second electrical generator operative to provide an output signal corresponding to a function of the speed of rotation of said chuck,
   (e) combining circuit means for effectively summing the outputs of said first and second signal generators and directing the combined signal to said servo valve,
   (f) a pressure transducer in said hydraulic supply system for generating a feedback signal as a function of pressure delivered by said servo valve,
   (g) comparator circuit means for comparing the outputs of said pressure transducer and said combining circuits, and
   (h) fault circuit means connected to said comparator circuit for outputting a fault condition in response to a consequential difference in signals from said pressure transducer and said combining circuit means.

2. A chuck force control according to claim 1, further characterized by
   (a) a redundant signal input circuit, including first and second signal generating means for generating signals respectively corresponding to functions of initial gripping pressure and rotating speed,
   (b) a redundant combining circuit for said redundant signals, and
   (c) redundant comparator circuit means for comparing signals from the first and second combining circuit means and for outputting a fault signal in response to a consequential difference between signals.

3. A chuck force control according to claim 2, further characterized by
   (a) one, but not both, of said second signal generating means comprising the tach generator for the drive of said rotary machine tool.

4. A chuck force control according to claim 2, further characterized by
   (a) said first signal generating means comprising paired potentiometers for operation in unison.

* * * * *